UNITED STATES PATENT OFFICE 2,039,045

NITRATION OF SUGARS AND THEIR GLYCOSIDES

Joseph A. Wyler, Allentown, Pa., assignor to Trojan Powder Company, a corporation of New York.

No Drawing. Application May 25, 1934, Serial No. 727,590

2 Claims. (Cl. 52—20)

My invention relates to improvements in the nitration of sugars and their glycosides, and more particularly relates to improved means for bringing about the nitration of sugars such as cane sugar, glucose, levulose, lactose, and the like, or the glycosides thereof, with the production of products having satisfactory physical characteristics particularly with reference to viscosity, and also having satisfactory chemical characteristics particularly with reference to stability. One of the objects of my invention is to provide means for the nitration of the various sugars and their glycosides.

My present invention rests upon my discovery that the nitrated sugars are soluble in a number of organic solvents of low viscosity which are themselves insoluble or substantially insoluble in the dilute spent acid of nitration, and that accordingly by dissolving or suspending a sugar in an organic liquid of low viscosity and of low solubility in spent acid it is possible to bring about the desirable nitration of the sugar with a larger yield than is obtained when the same sugar is nitrated directly in nitrating acid.

Among the organic liquids of low viscosity that I find can be used in the practice of my present invention are ethyl alcohol, ethyl nitrate, propyl alcohol, propyl nitrate, butyl alcohol, butyl nitrate, butyl ether, amyl nitrate, aliphatic saturated ethers, dichlorethyl ether, dichlorethane and tetrachlorethane.

As an example of my present invention I may take 150 parts by weight of 98% nitric acid cooled to about 0° C. and to this I add, with stirring and cooling, five parts by weight of amyl alcohol. The amyl alcohol is converted to amyl nitrate and forms a clear solution in the nitric acid. I next add 20 parts by weight of powdered sugar (cane sugar, for example) in small portions at a time, meanwhile cooling to keep the temperature below 15° C. When all of the sugar has been dissolved I add 300 parts, by weight, of concentrated sulfuric acid with continued stirring and cooling. The nitrated sugar and the amyl nitrate separate as a mixed solution on the surface of the spent acid. This thin solution is washed in water, stirred in weak aqueous alkali solution, and is then settled and separated as a clear and substantially non-aqueous or dry solution of nitrated sugar ready for use. The solution of nitrated sugar as thus prepared may be used in the formulation of explosives as a substitute for nitroglycerin or the like, by admixture with the usual constituents of explosives, or the solution may be mixed with oxidizing salts such as ammonium nitrate, sodium nitrate, ammonium perchlorate or the like, to form explosive mixtures for any desired use. The principal advantage in the application of my present invention is the avoidance of decomposition losses in the nitration of the sugars, and accordingly a notable improvement in the yield of the nitrated product obtained. In addition, however, I obtain a further advantage through the fact that the products obtained by the application of my present invention are limpid liquids of very low viscosity, which separate readily from the spent acid, in part due to their relatively low specific gravity, and in part to their relatively high fluidity and lack of solubility in the spent acid.

By the application of my present invention I am able to bring about the ready nitration of sugars that offer difficulties to nitration by the older methods, while in addition I obtain a relatively higher yield of the nitrated product, and a relatively higher recovery of spent acid in condition for recovery or re-use, than can be obtained by the methods in use up to the time of my present discovery.

It will be noted that some of the solvents that I employ are unnitrated at the time that they are introduced into the nitrating acid, but undergo nitration in the course of the nitration of the sugars which are dissolved or suspended within them. Other substances that I use as solvents are already nitrated bodies at the time that they are introduced into the nitrating acid. I find that it is the final condition of the solvent (at the end of the nitration period) rather than its initial condition, that determines the ability of the material to be used in the application of my invention, but I have found that when a material is already nitrated at the beginning of the nitrating treatment, or is of such chemical nature that it does not undergo nitration, it is advantageous to add these materials just before the nitrated sugar is precipitated out of the solution by the strong sulfuric acid which is added toward the end of the nitration operation.

Instead of first dissolving the sugar in the nitric acid and then adding a strong sulfuric acid in order to complete the nitration and to cause the separation of the nitrated product it is often preferable to add the sugar to a mixed acid consisting of approximately 50% sulfuric acid and 50% nitric acid, having present in this mixed acid one of the above thinning agents which cause the separation of the nitrated sugar as an oily suspension in the spent acid.

It will be noted that the characteristic feature of my invention is the dissolving or suspending of a sugar such as cane sugar, glucose, levulose, lactose, and the like in a suitable organic liquid of relatively high fluidity, either before nitration or during the nitration of such sugar, and utilizing the fluidity or low viscosity of the resulting mixture as a means of facilitating separation of the nitrated material from the spent acid resulting from nitration. The value of my invention rests largely, however, on the fact that when conducted as described the yields of nitrated product are notably higher than when the sugars are nitrated directly in nitrating acid, due to some protecting effect upon the decomposition of the nitrated product which results from the distention of the nitrated material within the solvent body at some stage of the nitration or separation steps.

It will of course be evident that in the performance of the nitrating reaction in accordance with my present invention, I may avail myself of all of the customary methods of avoiding side reactions such as may result from the presence of nitrous oxides, or of avoiding decomposition of my nitrated body from any other cause. For example, I may utilize urea nitrate, guanidine nitrate, or the nitrate of any weak base, as an addition product to the nitrating acid during the nitration.

Although I have used the term "a sugar" in this specification, I have found that the glycosides of the sugars are the full equivalents in all respects of the sugars, and behave in an exactly similar manner as these simple sugars in the practice of the present invention.

As many modifications may be made within the limits of the disclosure of my invention as herein set forth, no limitations should be made upon my invention except such as are indicated in the appended claims.

I claim:

1. In the nitration of a member of the group consisting of a sugar and its methyl glycoside the process which comprises bringing about a reaction between the body and a nitrating acid in the presence of a member of the group consisting of ethyl alcohol, ethyl nitrate, propyl alcohol, propyl nitrate, butyl alcohol, butyl nitrate, butyl ether, amyl nitrate, aliphatic saturated ethers, dichlorethylether, dichlorethane and tetrachlorethane.

2. As a step in the nitrating of a member of a group consisting of a sugar and its methyl glycoside, the process which comprises the reacting of nitric acid upon the body in the presence of a mononitrate of a low-boiling member of the methane series of hydrocarbons.

JOSEPH A. WYLER.